United States Patent
Narutaki et al.

(10) Patent No.: US 12,252,637 B2
(45) Date of Patent: Mar. 18, 2025

(54) TWO-PACK CURABLE URETHANE ADHESIVE

(71) Applicant: SANYO CHEMICAL INDUSTRIES, LTD., Kyoto (JP)

(72) Inventors: Yuko Narutaki, Kyoto (JP); Tetsuya Shimada, Kyoto (JP); Yuuki Tanaka, Kyoto (JP)

(73) Assignee: SANYO CHEMICAL INDUSTRIES, LTD., Kyoto (JP)

( * ) Notice: Subject to any disclaimer, the term of this patent is extended or adjusted under 35 U.S.C. 154(b) by 951 days.

(21) Appl. No.: 17/311,929

(22) PCT Filed: Dec. 9, 2019

(86) PCT No.: PCT/JP2019/048000
§ 371 (c)(1),
(2) Date: Jun. 8, 2021

(87) PCT Pub. No.: WO2020/121993
PCT Pub. Date: Jun. 18, 2020

(65) Prior Publication Data
US 2022/0089922 A1    Mar. 24, 2022

(30) Foreign Application Priority Data
Dec. 11, 2018 (JP) ................................. 2018-231230

(51) Int. Cl.
| | | |
|---|---|---|
| *C09J 175/08* | (2006.01) | |
| *C08G 18/12* | (2006.01) | |
| *C08G 18/16* | (2006.01) | |
| *C08G 18/22* | (2006.01) | |
| *C08G 18/32* | (2006.01) | |
| *C08G 18/48* | (2006.01) | |
| *C08G 18/73* | (2006.01) | |
| *C08G 18/75* | (2006.01) | |

(52) U.S. Cl.
CPC ............ *C09J 175/08* (2013.01); *C08G 18/12* (2013.01); *C08G 18/168* (2013.01); *C08G 18/225* (2013.01); *C08G 18/3206* (2013.01); *C08G 18/3228* (2013.01); *C08G 18/4804* (2013.01); *C08G 18/4825* (2013.01); *C08G 18/4829* (2013.01); *C08G 18/4845* (2013.01); *C08G 18/73* (2013.01); *C08G 18/755* (2013.01); *C08G 2170/00* (2013.01); *C09J 2301/30* (2020.08)

(58) Field of Classification Search
CPC .... C09J 175/08; C09J 175/04; C09J 2475/00; C08G 18/12; C08G 18/168; C08G 18/225; C08G 18/3206; C08G 18/3228; C08G 18/4804; C08G 18/4825; C08G 18/4829; C08G 18/4845; C08G 18/73; C08G 18/755; C08G 2170/00
See application file for complete search history.

(56) References Cited

U.S. PATENT DOCUMENTS

| | | | |
|---|---|---|---|
| 6,624,281 B1 | 9/2003 | Lawrey | |
| 7,625,993 B2 | 12/2009 | Burckhardt | |
| 2006/0122352 A1 | 6/2006 | Burckhardt | |
| 2013/0245194 A1* | 9/2013 | Huang | ................. C09D 201/10 524/588 |

FOREIGN PATENT DOCUMENTS

| | | |
|---|---|---|
| CN | 1461760 | 12/2003 |
| CN | 105209544 | 7/2018 |
| JP | 2002-188072 | 7/2002 |
| JP | 2006-182795 | 7/2006 |
| JP | 2006-213801 | 8/2006 |
| JP | 2007-308656 | 11/2007 |
| JP | 2015-4052 | 1/2015 |
| JP | 2015-124335 | 7/2015 |
| JP | 2016-204466 | 12/2016 |
| JP | 2016-204468 | 12/2016 |
| JP | 2018-2954 | 1/2018 |
| JP | 2018-204000 | 12/2018 |
| WO | 2013/146263 | 10/2013 |
| WO | 2014/200452 | 12/2014 |

OTHER PUBLICATIONS

International Search Report issued Feb. 10, 2020 in International (PCT) Patent Application No. PCT/JP2019/048000.

* cited by examiner

*Primary Examiner* — Scott R. Walshon
(74) *Attorney, Agent, or Firm* — Wenderoth, Lind & Ponack, L.L.P.

(57) ABSTRACT

A two-component curable urethane adhesive that is easy to handle while it is substantially solvent-free, having weak to strong adhesive properties, and being capable of forming a cured film having excellent physical properties. The two-component curable urethane adhesive contains: a main agent; and a curing agent, the main agent containing at least one of a hydroxy group-containing urethane prepolymer (P1) or a polyol component (A), the hydroxy group-containing urethane prepolymer (P1) being a reaction product between the polyol component (A) and an organic polyisocyanate component (B), the curing agent containing at least one of an isocyanate group-containing urethane prepolymer (P2) or an organic polyisocyanate component (B), the isocyanate group-containing urethane prepolymer (P2) being a reaction product between the polyol component (A) and the organic polyisocyanate component (B), and the two-component curable urethane adhesive satisfies properties (1) to (5) disclosed herein.

6 Claims, No Drawings

TWO-PACK CURABLE URETHANE ADHESIVE

TECHNICAL FIELD

The present invention relates to a two-component curable urethane adhesive.

BACKGROUND ART

Adhesives, such as urethane adhesives, acrylic adhesives, silicone adhesives, rubber-based adhesives, and other like known adhesives, are used in a wide range of fields and applications including optical parts, vehicle parts, building materials, and medical use.

Generally, urethane adhesives have low tack and tend not to have strong adhesive properties. Thus, acrylic adhesives that allow for a wide range of designs from weak adhesion to strong adhesion are the mainstream. Yet, with the diversification of needs, studies have been made on urethane adhesives because urethane adhesives have good followability to adherends, excellent adhesive properties, and the like (e.g., Patent Literature 1).

Yet, a urethane adhesive disclosed in Patent Literature 1 requires a large amount of a curing agent or an increased number of crosslinking points in order to impart strength to an adhesive sheet. Thus, the resulting adhesive has poor adhesion and poor flexibility, and a cured film of the adhesive is brittle.

In recent years, there has been a tendency for preference for substantially solvent-free urethane adhesives for environmental measures (VOC reduction). Substantially solvent-free urethane adhesives also tend to be preferred when used in application to the human body (such as skin).

Yet, improvement of physical properties of a cured film is preferably achieved by an increase in the molecular weight of a prepolymer, which results in a high viscosity, poor handling properties, and the like. Thus, organic solvents are often used in combination.

CITATION LIST

Patent Literature

Patent Literature 1: JP 2006-182795 A

SUMMARY OF INVENTION

Technical Problem

An object of the present invention is to provide a two-component curable urethane adhesive having an easy-to-handle viscosity while it is substantially solvent-free, having weak to strong adhesive properties, and being capable of forming a cured film having excellent properties.

Solution to Problem

As a result of extensive studies to solve the above problems, the present inventors completed the present invention. Specifically, the present invention provides a two-component curable urethane adhesive containing: a main agent; and a curing agent, the main agent containing at least one of a hydroxy group-containing urethane prepolymer (P1) or a polyol component (A), the hydroxy group-containing urethane prepolymer (P1) being a reaction product between the polyol component (A) and an organic polyisocyanate component (B), the curing agent containing at least one of an isocyanate group-containing urethane prepolymer (P2) or an organic polyisocyanate component (B), the isocyanate group-containing urethane prepolymer (P2) being a reaction product between the polyol component (A) and the organic polyisocyanate component (B), wherein the two-component curable urethane adhesive satisfies properties (1) to (5) described below. The present invention also provides a cured product of the two-component curable urethane adhesive; and a urethane adhesive sheet containing the cured product of the two-component curable urethane adhesive.

(1) At least one of the polyol component (A) used in the hydroxy group-containing urethane prepolymer (P1) or the polyol component (A) used as the main agent contains a polyol (A1) having at least one of a group represented by a formula (1) or a group represented by a formula (2) at a molecular end thereof, and a total number of groups represented by the formula (1) in the polyol (A1) accounts for 40% or more based on a total number of groups represented by the formulas (1) and (2) in the polyol (A1).

(2) An average total unsaturation degree of all the polyol components (A) used in the two-component curable urethane adhesive is 0.010 meq/g or less.

(3) A weight average molecular weight of each of the urethane prepolymer (P1) and the urethane prepolymer (P2) is 1,000 to 100,000.

(4) A chemical formula weight or number average molecular weight of each of the polyol component (A) and the organic polyisocyanate component (B) is 20,000 or less.

(5) A total weight of solvents in the main agent excluding the polyol component (A) and solvents in the curing agent excluding the organic polyisocyanate component (B) accounts for 5 wt % or less based on a total weight of the main agent and the curing agent,

[Chem. 1]

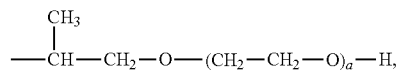

(1)

[Chem. 2]

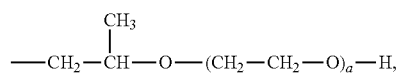

(2)

wherein in the formulas (1) and (2), each a is independently an integer of 0 or greater.

Advantageous Effects of Invention

The two-component curable urethane adhesive of the present invention is a urethane adhesive having an easy-to-handle viscosity while it is substantially solvent-free, having weak to strong adhesive properties, and being capable of forming a cured film having excellent physical properties.

DESCRIPTION OF EMBODIMENTS

The two-component curable urethane adhesive of the present invention contains a main agent and a curing agent, the main agent containing at least one of a hydroxy group-containing urethane prepolymer (P1) or a polyol component (A), the hydroxy group-containing urethane prepolymer (P1) being a reaction product between the polyol component (A) and an organic polyisocyanate component (B). The curing agent contains at least one of an isocyanate group-containing urethane prepolymer (P2) or an organic polyisocyanate component (B), the isocyanate group-containing urethane prepolymer (P2) being a reaction product between the polyol component (A) and the organic polyisocyanate component (B).

At least one of the polyol component (A) used in the hydroxy group-containing urethane prepolymer (P1) or the polyol component (A) used as the main agent contains a polyol (A1) having at least one of a group represented by a formula (1) or a group represented by a formula (2) at a molecular end thereof.

A total number of groups represented by the formula (1) in the polyol (A1) accounts for 40% or more based on a total number of groups represented by the formulas (1) and (2) in the polyol (A1).

In the formulas (1) and (2), each a is independently an integer of 0 or greater.

Examples of the at least one of the polyol (A1) used in the urethane prepolymer (P1) or the polyol (A1) used as the main agent include a polyoxyalkylene polyol (a1) having a hydroxypropyl group at a molecular end thereof represented by a formula (3) (i.e., a compound in which a is 0 in the formula (1) and a compound in which a is 0 in the formula (2)) and an ethylene oxide adduct (a2) of the polyoxyalkylene polyol (a1) (i.e., a compound having a group represented by the formula (1) in which a is 1 or greater and/or a compound having a group represented by the formula (2) in which a is 1 or greater).

Examples of the polyoxyalkylene polyol (a1) having a hydroxypropyl group at a molecular end thereof include compounds represented by the formula (3):

[Chem. 3]

$$X\text{---}[(A\text{-}O)p\text{-}(Z\text{---}O)q\text{-}H]m \quad (3)$$

In the formula (3), X is a m-valent residue produced by removing active hydrogen atoms from a compound having m active hydrogen atoms, and m is an integer of 2 to 20. When m is greater than 20, the polyoxyalkylene polyol (a1) may have a high viscosity, and the viscosity of a mixture of the main agent and the curing agent may be high during coating. Examples of the compound having m active hydrogen atoms include compounds having at least one group selected from the group consisting of a hydroxy group, a primary or secondary amino group, a carboxy group, and a mercapto group, such as hydroxy group-containing compounds, amino group-containing compounds, carboxy group-containing compounds, and thiols.

Examples of the hydroxy group-containing compounds include the followings:

compounds having a hydroxy group equivalent of 160 or less and having two or more hydroxy groups, such as C8-C15 aromatic ring-containing polyhydric alcohols, e.g., m- or p-xylylene glycol and 1,4-bis(hydroxyethyl)benzene, and aliphatic compounds having two or more hydroxy groups (i.e., C2-C20 aliphatic dihydric alcohols such as alkylene glycols (e.g., ethylene glycol, propylene glycol, 1,3-butylene glycol, 1,4-butanediol, 1,6-hexanediol, 3-methylpentanediol, neopentyl glycol, and 1,9-nonanediol); C3-C8 tri- to octahydric or higher polyhydric alcohols (e.g., glycerol, trimethylolpropane, pentaerythritol, sorbitol, xylitol, and mannitol); intermolecular or intramolecular dehydration products thereof (e.g., dipentaerythritol, polyglycerol (polymerization degree: 2 to 20), and sorbitan); saccharides and derivatives thereof such as glycoxydes (e.g., glucose, fructose, sucrose, and α-methylglucoside); C6-C15 (bi)cycloalkylene diols (e.g., 1,4-dihydroxycyclohexane, 1,4-bis(hydroxymethyl)cyclohexane, and 2,2-bis(4,4'-hydroxycyclohexyl)propan));

castor oil-based polyols (e.g., castor oil, partially dehydrated castor oil, and partially acylated castor oil);

polymers or oligomers having m hydroxy groups and having a number average molecular weight (hereinafter abbreviated to Mn) of 2,000 or less such as polyalkadiene (C4-C10) polyols (e.g., polybutadiene polyols and hydrogenated products thereof); hydroxyalkyl (C2-C4) (meth)acrylate (co)polymers; and polyvinyl alcohols (saponification degree: 60% or more);

polyhydric phenols such as monocyclic polyhydric phenols (e.g., pyrogallol, catechol, and hydroquinone), and bisphenols (e.g., bisphenol A, bisphenol F, and bisphenol S);

phosphoric acid compounds (e.g., phosphoric acid, phosphorous acid, and phosphonic acid); and mixtures of two or more thereof.

Mn in the present invention can be measured by gel permeation chromatography under the following conditions, for example.

Device: "Waters Alliance 2695" (available from Waters)
Column: "Guardcolumn Super H-L" (one column), and "TSKgel Super H2000 (one column), TSKgel Super H3000 (one column), and TSKgel Super H4000 (one column) (all available from Tosoh Corporation), connected in series"
Sample solution: 0.25 wt % solution in tetrahydrofuran
Amount of solution to be injected: 10 μl
Flow rate: 0.6 ml/min
Measurement temperature: 40° C.
Detector: refractive index detector
Standard substance: standard polyethylene glycol Examples of the amino group-containing compound include the followings:

primary monoamines such as C1-C20 mono (cyclo)alkylamines (e.g., methylamine, ethylamine, buthylamine, octylamine, dodecylamine, and cyclohexyamine), and C6-C12 aromatic or aromatic-aliphatic monoamines (e.g., aniline, toluidine, and benzylamine);

polyamines having two or more active hydrogens such as C2-C12 or more aliphatic diamines (alkylene diamines such as ethylenediamine, propylenediamine, hexamethylenediamine, and mono- or di-alkyl (C1-C4) alkylenediamines (e.g., dimethyl propylenediamine)); C6-C15 alicyclic diamines (e.g., 1,4-diaminocyclohexane, isophoronediamine, and 4,4'-diaminocyclohexylmethane); C6-C15 aromatic diamines (e.g., m- or p-phenylenediamine, tolylenediamine, diethyltoluenediamine, 4,4'-diaminophenylmethane, and 2,2-bis(4,4'-diaminophenyl)propane); C8-C15 aromatic-aliphatic diamines (e.g., m- or p-xylylenediamine); C4-C10 heterocyclic polyamines (e.g., piperazine, aminoalkyl (C2-C4) piperazines (e.g., aminoethylpiperazine), and aminoalkyl (C2-C4) imidazoles), and polyalkylene polyamines in which the alkylene group has two to four carbon atoms such as diethylenetriamine, dipropylenetriamine, triethylenetetramine, polyethyleneimine having an Mn of 2,000 or less, and mono-, di-, or tri-alkyl (C1-C4) polyalkylene polyamines (e.g., dimethyl dipropylenetriamine);

mono- or di-alkanolamines in which the hydroxyalkyl group has two to four carbon atoms (e.g., monoethanolamine, monoisopropanolamine, diethanolamine, and diisopropanolamine);

polymers or oligomers having one or two or more amino groups and having an Mn of 2,000 or less such as aminoalkyl (C2-C4) (meth)acrylate (co)polymers and polyether (poly)amines (e.g., polyoxypropylenediamine and polyoxypropylenetriamine); and mixtures of two or more thereof.

Examples of the carboxy group-containing compound include C2-C36 aliphatic polycarboxylic acids (e.g., succinic acid, glutaric acid, adipic acid, sebacic acid, maleic acid, fumaric acid, and dimerized linoleic acid), C8-C15 aromatic polycarboxylic acids (e.g., phthalic acid, isophthalic acid, terephthalic acid, trimellitic acid, and pyromellitic acid), unsaturated carboxylic acid polymers (e.g., (meth)acrylic acid (co)polymers having an Mn of 2,000 or less), and mixtures of two or more thereof.

Examples of the thiol include di- to octathiols having two to six or more carbon atoms (e.g., ethanedithiol, propanedithiol, 1,3- or 1,4-butanedithiol, 1,6-hexanedithiol, and 3-methyl-1,5-pentanedithiol).

Preferred of these in terms of curability are hydroxy group-containing compounds and amino group-containing compounds; more preferred are aliphatic compounds having a hydroxy group equivalent of 160 or less and two or more hydroxy groups, and castor oil-based polyols; and particularly preferred are propylene glycol, glycerol, pentaerythritol, dipentaerythritol, polyglycerol (polymerization degree: 2 to 20), and castor oil.

A in the formula (3) is a C2-C12 alkylene group in which one or more hydrogen atoms are optionally replaced by phenyl groups, halogenated phenyl groups, or halogen atoms. Examples thereof include C2-C12 linear or branched alkylene groups, C6-C10 cycloalkylene groups, and those in which one or more hydrogen atoms of these compounds are replaced by phenyl groups, halogenated phenyl groups, or halogen atoms (e.g., Cl and Br).

Specific examples of A include an ethylene group, a 1,2- or 1,3-propylene group, a 1,2-, 2,3-, 1,3- or 1,4-butylene group, a C5-C12 1,2-alkylene group (e.g., a 1,2-dodecylene group), a 1,2-cyclohexylene group, a chloropropylene group, a bromopropylene group, a phenylethylene group, and a chlorophenylethylene group.

(A-O) in the formula (3) is obtained by adding alkylene oxide (hereinafter abbreviated to AO) to the compound having m active hydrogen atoms. Examples of AO to be used include ethylene oxide (hereinafter abbreviated to EO), 1,2-propylene oxide (hereinafter abbreviated to PO), 1,3-propylene oxide, 1,2-, 1,3-, 2,3-, or 1,4-butylene oxide (hereinafter, butylene oxide is abbreviated to BO), C5-C12 α-olefin oxide, epihalohydrins (e.g., epichlorohydrin and epibromohydrin), styrene oxide, 1,2-cyclohexene oxide, and combinations of two or more thereof. When p (A-O)s each include two or more types oxyalkylene groups, these (A-O)s may be bonded in a block or random manner. Preferred of these in terms of flexibility are PO and 1,2-BO.

In the formula (3), Z is a propylene group, p is an integer of 0 to 199, q is an integer of 1 to 200, with p and q satisfying the following formula: $1 \leq p+q \leq 200$.

For example, $^1$H-NMR can be used to confirm the presence of a hydroxypropyl group at an end of the polyoxyalkylene polyol (a1). The hydroxypropyl group includes a group having a primary hydroxy group (a hydroxy group bonded to a primary carbon) represented by the following chemical formula (4), and a group having a secondary hydroxy group (a hydroxy group bonded to a secondary carbon) represented by a chemical formula (4'). A primary hydroxy group content (hereinafter abbreviated to a primary content) indicating the percentage of the number of primary hydroxy group-containing groups to the total number of primary hydroxy group-containing groups and secondary hydroxy group-containing groups is preferably 40% or more, more preferably 60% or more, particularly preferably 70% or more, in terms of adhesion and in order to prevent interfacial failure of the adhesive during peeling.

[Chem. 4]

(4)

[Chem. 5]

(4')

The primary content can be determined by $^1$H-NMR measurement after pre-treating (esterifying) a sample in advance.

The following describes details of $^1$H-NMR.

<Sample Preparation Method>

A sample to be measured (about 30 mg) is weighed into an NMR sample tube having a diameter of 5 mm, and a deuterated solvent (about 0.5 ml) is added to dissolve the sample. Subsequently, trifluoroacetic anhydride (about 0.1 ml) is added, whereby a sample for analysis is obtained. The deuterated solvent is a solvent that can dissolve the sample, and is suitably selected from, for example, deuterated chloroform, deuterated toluene, deuterated dimethyl sulfoxide, or deuterated dimethyl formamide.

<NMR Measurement>

$^1$H-NMR measurement is performed under common conditions.

<Primary Content Calculation Method>

By the pre-treatment method described above, the hydroxy group at the end of the polyoxyalkylene polyol reacts with the trifluoroacetic anhydride added and is converted into a trifluoroacetic acid ester. As a result, a signal derived from a methylene group to which the primary hydroxy group is bonded is observed around 4.3 ppm, and a signal derived from a methine group to which the secondary hydroxy group is bonded is observed around 5.2 ppm. The primary content is calculated by the following formula.

Primary content (%)=$[x/(x+2 \times y)] \times 100$, where x is an integral value of signals derived from methylene groups to which the primary hydroxy groups are bonded around 4.3 ppm, and y is an integral value of signals derived from methine groups to which the secondary hydroxy groups are bonded around 5.2 ppm.

The polyoxyalkylene polyol (a1) can be produced, for example, by the method disclosed in JP 2000-344881 A. Preferred examples of the polyoxyalkylene polyol (a1) include one obtained by ring-opening addition polymerization of PO to an active hydrogen-containing compound (a0) represented by the following formula (5) in the presence of a tris(pentafluorophenyl)borane catalyst (hereinafter abbreviated to TPB). When ring-opening addition polymerization of PO is performed using TPB as a catalyst, the addition reaction tends to proceed in such a manner that the hydroxy group at the end is selectively converted into a group represented by the chemical formula (4).

[Chem. 6]

(5)

X, A, and m in the formula (5) are the same as those in the formula (3), and p is an integer of 0 or 1 to 199.

When p is 0, specific examples of the active hydrogen-containing compound (a0) include those mentioned as example compounds having m active hydrogen atoms in the description of the formula (3).

When p is 1 or greater, the active hydrogen-containing compound (a0) is a polyol obtainable by (co)addition of AO(s) to the compound having m active hydrogen atoms using a conventionally known catalyst (e.g., alkali metal hydroxide). Preferred examples include a PO adduct of propylene glycol, a PO adduct of glycerol, a PO adduct of polyglycerol, a 1,2-BO adduct of propylene glycol, a 1,2-BO adduct of glycerol, 1,2-BO adduct of polyglycerol, and a PO/1,2-BO co-adduct (block or random) of glycerol.

The amount of TPB used during production of the polyoxyalkylene polyol (a1) by ring-opening addition polymerization of PO to the active hydrogen-containing compound (a0) is not limited. Yet, the amount is preferably 0.00005 to 10 wt %, more preferably 0.0001 to 1 wt %, based on the weight of the polyoxyalkylene polyol (a1).

The number of moles of PO added is 1 to 200 moles, preferably 2 to 100 moles, more preferably 3 to 30 moles per active hydrogen atom of the active hydrogen-containing compound (a0). When the number of moles of all AOs (total of AO in a first stage and PO in a second stage) added per active hydrogen atom of the compound having m active hydrogen atoms is 1 to 200 moles, preferably 3 to 100 moles. When these numbers of moles added are 200 moles or less, the polyoxyalkylene polyol (a1) has a moderate viscosity, and it is possible to prevent the viscosity of a mixture of the main agent and the curing agent from becoming too high.

Thus, q in the formula (3) is 1 to 200, preferably 2 to 100, more preferably 3 to 30. In addition, p+q in the formula (3) is 1 to 200, preferably 3 to 100.

The reaction temperature during ring-opening addition polymerization of PO is preferably 0° C. to 250° C., more preferably 20° C. to 180° C. In order to control the reaction temperature, preferably, PO is added dropwise to a mixture of the active hydrogen-containing compound (a0) and TPB, or a mixture of PO and TPB is added dropwise to the active hydrogen-containing compound (a0).

The thus-produced addition polymer contains TPB which is subjected to removal by adsorption with an adsorbent such as synthetic silicate (e.g., magnesium silicate or aluminum silicate) or activated clay.

Preferred examples of the polyoxyalkylene polyol (a1) forming the polyol component (A) in the present invention include a PO adduct of propylene glycol, a PO adduct of polypropylene glycol (a terminal secondary hydroxy group), a PO adduct of glycerol, a PO adduct of polyglycerol, a PO adduct of a 1,2-BO adduct of propylene glycol (a terminal secondary hydroxy group), a PO adduct of a 1,2-BO adduct of glycerol (a terminal secondary hydroxy group), a PO adduct of a 1,2-BO adduct of polyglycerol (a terminal secondary hydroxy group), and a PO adduct of castor oil.

The EO adduct (a2) of the polyoxyalkylene polyol (a1) in the present invention can be obtained by adding EO to the polyoxyalkylene polyol (a1) by a common method. The amount of oxyethylene groups added is preferably 40 wt % or less, more preferably 30 wt % or less, particularly preferably 20 wt % or less, more particularly preferably 15 wt % or less, most preferably 10 wt % or less, based on the total weight of oxyalkylene groups in the EO adduct (a2) of the polyoxyalkylene polyol (a1), in order to suppress a reduction in post-damp-heat-test adhesion.

The total amount of the polyoxyalkylene polyol (a1) and the EO adduct (a2) of the polyoxyalkylene polyol (a1) in the polyol component (A) in the present invention (or the amount of (a1) or (a2) when only one of them is used) is preferably 50 wt % or more, more preferably 70 wt % or more, based on the weight of the polyol component (A). When the amount is less than 50 wt %, it may be difficult to obtain the effects of the present invention.

The hydroxy value of each of the polyoxyalkylene polyol (a1) and the EO adduct (a2) of the polyoxyalkylene polyol (a1) is preferably 5 to 800 mg KOH/g, more preferably 10 to 450 mg KOH/g, particularly preferably 30 to 300 mg KOH/g, although it varies depending on whether another polyol (a3) (described in detail later) is used in combination and the type of the polyol to be used in combination.

When another polyol having a relatively high molecular weight (hydroxy value: less than 400 mg KOH/g) is used in combination, one having a relatively high hydroxy value of, for example, 400 to 1,500 mg KOH/g, particularly, 450 to 1,200 mg KOH/g, is preferred. The hydroxy value can be measured by the method described in JIS K1557-1.

Two or more polyoxyalkylene polyols (a1) may be used in combination, and two or more EO adducts (a2) may be used in combination. Examples of the form of combination include the followings: a combination of those different in the type of the active hydrogen-containing compound (a0), such as one based on a polyhydric alcohol (e.g., glycerol) and one based on a polyamine (e.g., ethylenediamine)); a combination of those different in the functional group number (m in the formula (3)), such as one based on a bi- or trifunctional compound (e.g., ethylene glycol or glycerol) and one based on a tetra- to octafunctional compound (e.g., pentaerythritol, sorbitol, or sucrose); and a combination of those different in the hydroxy value or number of moles of AO added (p+q in the formula (3)), such as one having a hydroxy value of 400 mg KOH/g or more (e.g., 450 to 700 mg KOH/g) and one having a hydroxy value of less than 400 mg KOH/g (e.g., 30 to 300 mg KOH/g).

The polyol component (A) in the present invention may contain another polyol (a3) in addition to the polyoxyalkylene polyol (a1) and the EO adduct (a2) of the polyoxyalkylene polyol (a1).

Examples of the other polyol (a3) include polyether polyols, polyester polyols, polyolefin polyols, polyalkadiene polyols, and acrylic polyols.

Examples of the polyether polyols include polyethylene glycol, polytetramethylene ether glycol, poly-3-methyltetramethylene ether glycol, copolymer polyoxyalkylene diols (e.g., tetrahydrofuran (THF)/EO copolymer diols, and THF/3-methyltetrahydrofuran copolymer diols (weight ratio: 1/9 to 9/1, for example)), and AO adducts of bisphenol-based compounds other than the polyoxyalkylene polyol (a1) or the EO adduct (a2) of the polyoxyalkylene polyol (a1); trifunctional or higher polyether polyols other than the polyoxyalkylene polyol (a1) or the EO adduct (a2) of the polyoxyalkylene polyol (a1), such as AO adducts of trihydric or higher polyhydric alcohols (e.g., AO adduct of glycerol and AO adduct of trimethylolpropane); and products of coupling of one or more of these using methylene dichloride.

Examples of the polyester polyols include the followings:
castor oil fatty acid ester polyols (e.g., castor oil, partially dehydrated castor oil, and castor oil fatty acid ester);
linear or branched polyester polyols formed from polyols (e.g., the hydroxy group-containing compounds, the polyoxyalkylene polyol (a1) and the EO adduct (a2) of the polyoxyalkylene polyol (a1), and the other polyol (a3)) and poly (n=2 to 3 or higher) carboxylic acids such as aliphatic saturated or unsaturated polycarboxylic acids (C2-C40, e.g., oxalic acid, adipic acid, azelaic acid, dodecanoic acid, maleic acid, fumaric acid, itaconic acid, and dimerized linoleic acid), aromatic ring-containing polycarboxylic acids (C8-C15, e.g., phthalic acid, isophthalic acid, terephthalic acid, and 2,6-naphthalenedicarboxylic acid), and alicyclic ring-containing polycarboxylic acids (C7-C15, e.g., 1,3-pentanedicarboxylic acid and 1,4-hexanedicarboxylic acid);
polylactone polyols such as polyols obtained by addition polymerization of (substituted) caprolactone (C6-C10, e.g., ε-caprolactone, α-methyl-ε-caprolactone, or ε-methyl-ε-caprolactone) using, as an initiator, one or a mixture of two or more of the above hydroxy group-containing compounds (e.g., those with two or three valences) in the presence of a catalyst (e.g., an organometallic compound, a metal chelating compound, or a fatty acid metal acyl compound) (e.g., polycaprolactone polyol);
polyether ester polyols obtained by addition polymerization of AO (e.g., EO and PO) to a polyester having a carboxy group and/or hydroxy group at an end thereof, other than the polyoxyalkylene polyol (a1) or the EO adduct (a2) of the polyoxyalkylene polyol (a1); and
polycarbonate polyols.

Examples of the polyolefin polyols include polyisobutene polyols.

Examples of the polyalkadiene polyols include polyisoprene polyols, polybutadiene polyols, hydrogenated polyisoprene polyols, and hydrogenated polybutadiene polyols.

Examples of the acrylic polyols include copolymers of (meth)acrylic acid alkyl (C1-C30 alkyl) esters (e.g., butyl (meth)acrylate) and hydroxy group-containing acrylic monomers (e.g., hydroxyethyl (meth)acrylate).

The average total unsaturation degree of all the polyol components (A) used in the two-component curable urethane adhesive of the present invention is required to be 0.010 meq/g or less. In other words, when two or more of the polyol components (A) are used in one of the main agent or the curing agent or when one or more of the polyol components (A) are used in both the main agent and the curing agent, it is possible to use a component having a total unsaturation degree of more than 0.010 meq/g, but the average total unsaturation degree of all the polyol components (A) used in the main agent and the curing agent is required to be 0.010 meq/g or less. When the average total unsaturation degree is more than 0.010 meq/g, a cured film of the urethane adhesive has poor physical properties and is brittle.

The average total unsaturation degree of all the polyol components (A) used in the two-component curable urethane adhesive is preferably 0.007 meq/g or less, more preferably 0.005 meq/g or less.

The total unsaturation degree in the present invention can be measured by the method described in JIS K1557-3.

The method of reducing the total unsaturation degree of the polyol components (A) is not limited. For example, in the case of the polyoxyalkylene polyol (a1) having a hydroxypropyl group at a molecular end thereof, the following method is preferred: PO is subjected to ring-opening addition polymerization to the active hydrogen-containing compound (a0) in the presence of TPB; further, the allyl group of an allyl group-containing compound produced by a side reaction during the PO addition reaction is rearranged to a propenyl group in the presence of an alkali; the alkali is removed by an adsorbent; and the propenyl group is hydrolyzed in the presence of an acid and converted into a hydroxy group.

The hydroxy group equivalent (Mn per hydroxy group) of the polyol component (A) in the present invention is preferably 200 or more.

The chemical formula weight or Mn of the polyol component (A) is required to be 20,000 or less, in terms of viscosity of the two-component curable urethane adhesive. The chemical formula weight or Mn of the polyol component (A) is preferably 200 to 12,000, more preferably 500 to 6,000, in terms of film strength of the urethane adhesive after curing.

Examples of the organic polyisocyanate component (B) in the present invention include a C4-C22 acyclic aliphatic polyisocyanate (b1), a C8-C18 alicyclic polyisocyanate (b2), a C8-C26 aromatic polyisocyanate (b3), a C10-C18 aromatic-aliphatic polyisocyanate (b4), and a modified product (b5) of any of these polyisocyanates, each having two to three or more isocyanate groups. These organic polyisocyanate components (B) may be used alone or in combination of two or more thereof.

Examples of the C4-C22 acyclic aliphatic polyisocyanate (b1) include ethylene diisocyanate, tetramethylene diisocyanate, hexamethylene diisocyanate (hereinafter abbreviated to HDI), dodecamethylene diisocyanate, 1,6,11-undecane triisocyanate, 2,2,4-trimethylhexamethylene diisocyanate, lysine diisocyanate, 2,6-diisocyanatomethyl caproate, bis(2-isocyanatoethyl)fumarate, bis(2-isocyanatoethyl) carbonate, and 2-isocyanatoethyl-2,6-diisocyanatohexanoate.

Examples of the C8-C18 alicyclic polyisocyanate (b2) include isophorone diisocyanate (hereinafter abbreviated to IPDI), 4,4'-dicyclohexylmethane diisocyanate (hereinafter abbreviated to hydrogenated MDI), cyclohexylene diisocyanate, methylcyclohexylene diisocyanate, bis(2-isocyanatoethyl)-4-cyclohexene-1,2-dicarboxylate, and 2,5- or 2,6-norbornane diisocyanate.

Examples of the C8-C26 aromatic polyisocyanate (b3) include 1,3- or 1,4-phenylene diisocyanate, 2,4- or 2,6-tolylene diisocyanate (hereinafter abbreviated to TDI), crude TDI, 4,4'- or 2,4'-diphenylmethane diisocyanate (hereinafter abbreviated to MDI), crude MDI, polyaryl polyisocyanate, 4,4'-diisocyanatobiphenyl, 3,3'-dimethyl-4,4'-diisocyanatobiphenyl, 3,3'-dimethyl-4,4'-diisocyanatodiphenyl methane, 1,5-naphthalene diisocyanate, 4,4',4"-triphenylmethane triisocyanate, and m- or p-isocyanatophenyl sulfonyl isocyanate.

Examples of the C10-C18 aromatic-aliphatic polyisocyanate (b4) include m- or p-xylylene diisocyanate and α,α,α', α'-tetramethylxylylene diisocyanate.

Examples of the modified product (b5) of any of the polyisocyanates (b1) to (b4) include modified products of the polyisocyanates (e.g., modified products containing a urethane group, a carbodiimide group, an allophanate group, a urea group, a biuret group, a uretdione group, a uretoimine group, an isocyanurate group, or an oxazolidone group, having an amount of free isocyanate groups of 8 to 33 wt %, preferably 10 to 30 wt %, particularly 12 to 29 wt %), such as modified MDIs (urethane-modified MDI, carbodiimide-modified MDI, and trihydrocarbyl phosphate-modified MDI), urethane-modified TDI, HDI biuret, HDI isocyanurate, IPDI isocyanurate, and other like modified products of polyisocyanates.

Preferred of these organic polyisocyanate components (B) are the C4-C22 acyclic aliphatic polyisocyanate (b1), the C8-C18 alicyclic polyisocyanate (b2), and modified products thereof, and more preferred are the C4-C22 acyclic aliphatic polyisocyanate (b1) and modified products thereof, in terms of hue of a cured product of the two-component curable urethane adhesive.

The chemical formula weight or Mn of the organic polyisocyanate component (B) is required to be 20,000 or less, in terms of viscosity of the two-component curable urethane adhesive.

The chemical formula weight or Mn of the organic polyisocyanate component (B) is preferably 100 to 1,500, more preferably 150 to 600, in terms of film strength of the urethane adhesive after curing.

The hydroxy group-containing urethane prepolymer (21) used in the main agent and the isocyanate group-containing urethane prepolymer (P2) used in the curing agent of the two-component curable urethane adhesive of the present invention can be obtained by reacting the polyol component (A) with the organic polyisocyanate component (B) by a common method.

The hydroxy group-containing urethane prepolymer (P1) or the isocyanate group-containing urethane prepolymer (P2) can be produced by adjusting the ratio of the hydroxy group equivalent of the polyol component (A) to the isocyanate equivalent of the organic polyisocyanate component (B).

A known reaction device (e.g., a mixing tank with a stirrer or a static mixer) can be used for reaction. The reaction temperature is preferably 10° C. to 160° C., more preferably 25° C. to 120° C., in terms of reactivity and in order to prevent thermal deterioration. Preferably, the gas phase is purged with nitrogen for stability.

The ratio of the isocyanate group equivalent of the organic polyisocyanate component (B) to the hydroxy group equivalent of the polyol component (A) (isocyanate group equivalent/hydroxy group equivalent) when reacting the polyol component (A) with the organic polyisocyanate component (B) is 0.3 to 2.5, preferably 0.6 to 2.0, more preferably 0.9 to 1.5, in terms of strength and adhesion of the resulting urethane adhesive sheet.

The weight average molecular weight (hereinafter abbreviated to Mw) of the urethane prepolymers (P1) and (P2) in the present invention is 1,000 to 100,000, preferably 2,000 to 80,000, more preferably 3,000 to 40,000, in terms of viscosity of the urethane prepolymers and strength and adhesion of the resulting urethane adhesive sheet.

Mw in the present invention can be measured by gel permeation chromatography under the following conditions, for example. When the sample is a compound having an isocyanate group, the isocyanate group is capped with methanol before measurement.

Device: "HLC-8120GPC" (available from Tosoh Corporation) Column: "GuardcolumnH$_{XL}$-H" (one column) and "TSKgel GMH$_{XL}$" (two columns) (all available from Tosoh Corporation)
Sample solution: 0.25 wt % solution in tetrahydrofuran
Amount of solution to be injected: 100 µl
Flow rate: 1 ml/min
Measurement temperature: 40° C.
Detector: refractive index detector
Standard substance: standard polystyrene As described above, the two-component curable urethane adhesive of the present invention contains the main agent and the curing agent, the main agent containing at least one of the hydroxy group-containing urethane prepolymer (P1) or the polyol component (A), the curing agent containing at least one of the isocyanate group-containing urethane prepolymer (P2) or the organic polyisocyanate component (B).

As described above, at least one of the polyol component (A) used in the hydroxy group-containing urethane prepolymer (P1) or the polyol component (A) used as the main agent contains the polyol (A1) having at least one of a group represented by the formula (1) or a group represented by the formula (2) at a molecular end thereof, and the total number of groups represented by the formula (1) in the polyol (A1) accounts for 40% or more based on the total number of groups represented by the formulas (1) and (2) in the polyol (A1). In other words, it is required to satisfy the following conditions.

When the polyol (A1) consists of polyoxyalkylene polyol (a1), the primary hydroxy group content of the polyoxyalkylene polyol (a1) is required to be at least 40%. When the polyol (A1) consists of two or more polyoxyalkylene polyols (a1), the primary hydroxy group content of a mixture of these polyoxyalkylene polyols is required to be at least 40%.

When the polyol (A1) consists of the ethylene oxide adduct (a2), the primary hydroxy group content of (a1) before addition of ethylene oxide is required to be at least 40%. When the polyol (A1) consists of two or more polyoxyalkylene polyols (a1) before addition of ethylene oxide, the primary hydroxy group content of a mixture of these polyoxyalkylene polyols is required to be at least 40%.

When the polyol (A1) is a mixture of the polyoxyalkylene polyol (a1) and the ethylene oxide adduct (a2), the primary hydroxy group content of the mixture is required to be at least 40%, assuming the mixture includes the polyoxyalkylene polyol (a1) before addition of ethylene oxide to form the ethylene oxide adduct (a2) and the polyoxyalkylene polyol (a1) in the polyol (A1).

When the total number of groups represented by the formula (1) in the polyol (A1) accounts for less than 40%, the resulting adhesive has poor adhesion and is less prevented from the interfacial failure during peeling. The total number of groups represented by the formula (1) in the polyol (A1) accounts for preferably 60% or more, more preferably 70% or more, in terms of adhesion and in order to prevent interfacial failure of the adhesive during peeling.

The total weight of the main agent and the curing agent in the two-component curable urethane adhesive of the present invention is preferably 70 to 100 wt %, more preferably 80 to 100 wt %, particularly preferably 90 to 100 wt %, based on the weight of the two-component curable urethane adhesive, in terms of film strength of the adhesive after curing.

The total weight of solvents in the main agent (excluding the polyol component (A)) and solvents in the curing agent (excluding the organic polyisocyanate component (B)) in the present invention accounts for 5 wt % or less, preferably 3 wt % or less, particularly preferably 1 wt % or less, most preferably 0 wt % (i.e., a solvent-free two-component curable urethane adhesive), based on the total weight of the main agent and the curing agent, in terms of VOC reduction and application to the human body (e.g., skin).

Examples of the solvent include toluene, xylene, ethyl acetate, butyl acetate, dimethyl formamide, acetone, methyl ethyl ketone, and tetrahydrofuran.

In terms of strength and adhesion of the urethane adhesive sheet, preferably, the urethane prepolymers (P1) and (P2) are contained in one of the main agent or the curing agent, and particularly preferably, the urethane prepolymers (P1) and (P2) are contained in both the main agent and the curing agent.

When the curing agent consists of the organic polyisocyanate component (B), the organic polyisocyanate component (B) is preferably one having an average functional group number of 2 to 6 (more preferably 2 to 5, particularly preferably 2 to 4), most preferably a biuret or isocyanurate of the C4-C22 acyclic aliphatic polyisocyanate (b1) or the C8-C18 alicyclic polyisocyanate (b2), in terms of curability.

When producing the urethane prepolymers (P1) and (P2), the two-component curable urethane adhesive, and the adhesive sheet using the two-component curable urethane adhesive of the present invention, a urethane-forming catalyst can be used depending on application and degree of demand for curability.

Examples of the urethane-forming catalyst include metal catalysts and amine catalysts. Examples of the metal catalysts include tin-based catalysts (e.g., trimethyltin laurate, trimethyltin hydroxide, dimethyltin dilaurate, dibutyltin diacetate, dibutyltin dilaurate, stannous octoate, and dibutyltin maleate); lead-based catalysts (e.g., lead oleate, lead 2-ethylhexanoate, lead naphthenate, and lead octenoate); bismuth-based catalysts (e.g., bismuth carboxylate, bismuth alkoxide, and chelating compounds of a dicarbonyl group-containing compound with bismuth); titanium-based catalysts (e.g., isopropoxy tri(N-ethylaminoethyl aminato)titanium, tetrabutyl titanate, and tetraisopropylbisdioctyl phosphite titanate); zinc-based catalysts (e.g., organozinc complexes); zirconium-based catalysts (e.g., zirconium tetraacetylacetonate and zirconium tributoxyacetylacetonate); aluminum-based catalysts (e.g., aluminum complexes); iron-based catalysts such as iron carboxylate compounds (e.g., iron lactate and iron ricinoleate), ferrocene-based compounds (e.g., ferrocene and acetylferrocene), and phthalocyanine iron; and other metal catalysts such as metal salts of naphthenic acid (e.g., cobalt naphthenate) and phenylmercury propionate.

Examples of the amine catalysts include triethylenediamine, tetramethylethylenediamine, diazabicycloalkenes (e.g., 1,8-diazabicyclo[5.4.0]undecene-7 (DBU® available from San-Apro Ltd.)), dialkyl (C1-C3) aminoalkyl (C2-C4) amines (e.g., dimethylaminoethylamine, dimethylaminopropylamine, diethylaminopropylamine, and dipropylaminopropylamine), heterocyclic aminoalkyl (C2-C6) amines (e.g., 2-(1-aziridinyl)ethylamine, and 4-(1-piperidinyl)-2-hexylamine), N-methylmorpholine, and N-ethylmorpholine.

Preferred of these are diazabicycloalkenes, bismuth-based catalysts, tin-based catalysts, and zinc-based catalysts, and particularly preferred are DBU, bismuth carboxylate, dibutyltin dilaurate, and organozinc complexes.

The amount of the urethane-forming catalyst used can be suitably selected depending on application. Yet, when fast curability is required, the amount is preferably 3,000 ppm or less, more preferably 1 to 2,000 ppm, particularly preferably 10 to 1,000 ppm, based on the weight of the two-component curable urethane adhesive. These urethane-forming catalysts may be used alone or in combination of two or more thereof.

The two-component curable urethane adhesive of the present invention may further contain additives such as antioxidants, UV absorbers, plasticizers, adhesion-imparting agents, fillers, pigments, antistatic agents, and anti-gelling agents (agents to retard urethane formation), as long as the effects of the present invention are not impaired. The additives may be added to either the main agent or the curing agent, and may be added at the time of blending the main agent and the curing agent. Yet, preferably, the additives are pre-added to the main agent.

Examples of the antioxidants include hindered phenolic compounds (e.g., triethylene glycol-bis[3-(3-t-butyl-5-methyl-4-hydroxyphenyl)propionate], pentaerythrityl-tetrakis[3-(3,5-di-t-butyl-4-hydroxyphenyl) propionate], and 2,2-thio-diethylene bis[3-(3,5-di-t-butyl-4-hydroxyphenyl) propionate]), and phosphite ester compounds (e.g., tris(2,4-di-t-butylphenyl)phosphite, 2,2-methylene bis(4,6-di-t-butylphenyl)octylphosphite, bis(2,6-di-t-butylphenyl) pentaerythritol-di-phosphite, and tetrakis(2,4-di-t-butylphenyl)4,4'-biphenylene-di-phosphonite). These antioxidants may be used alone or in combination of two or more thereof. The amount of the antioxidant(s) used is preferably 5 wt % or less, more preferably 0.05 to 1 wt %, based on the weight of the two-component curable urethane adhesive, in terms of antioxidant effect and adhesion.

Examples of the UV absorbers include salicylic acid derivatives (e.g., phenyl salicylate, p-octylphenyl salicylate, and p-t-butylphenyl salicylate), benzophenone compounds (e.g., 2,4-dihydroxybenzophenone, 2-hydroxy-4-methoxybenzophenone, 2,2'-dihydroxy-4-methoxybenzophenone, 2,2'-dihydroxy-4,4'-dimethoxybenzophenone, 2,2'-dihydroxy-4,4'-dimethoxy-5-sulfobenzophenone, 2-hydroxy-4-methoxy-2'-carboxybenzophenone, 2-hydroxy-4-methoxy-5-sulfobenzophenone·trihydrate, 2-hydroxy-4-n-octoxybenzophenone, 2-hydroxy-4-octadecyloxybenzophenone, 2,2',4,4'-tetrahydroxybenzophenone, 4-dodecyloxy-2-hydroxybenzophenone, 2-hydroxy-4-(2-hydroxy-3-methacryloxy)propoxybenzophenone, and bis(2-methoxy-4-hydroxy-5-benzoylphenyl)methane), benzotriazole compounds (e.g., 2-(2'-hydroxy-5'-methylphenyl)benzotriazole, 2-(2'-hydroxy-3',5'-di-t-butylphenyl)benzotriazole, 2-(2'-hydroxy-3'-t-butyl-5'-methylphenyl)-5-chlorobenzotriazole, 2-(2'-hydroxy-3',5'-di-t-butyl-phenyl)-5-chlorobenzotriazole, 2-(2'-hydroxy-4'-n-octoxyphenyl)benzotriazole, 2-(2'-hydroxy-5'-t-butylphenyl)benzotriazole, 2-(2'-hydroxy-3',5'-di-t-amylphenyl)benzotriazole, 2-[2'-hydroxy-3'-(3",4",5",6"-tetrahydrophthalimidemethyl)-5'-methylphenyl]benzotriazole, and 2,2-methylene bis[4-(1,1,3,3-tetramethylbutyl)-6-(2H-benzotriazol-2-yl)phenol]), and cyanoacrylate compounds (e.g., 2-ethylhexyl-2-cyano-3,3'-diphenylacrylate, and ethyl-2-cyano-3,3'-diphenylacrylate). These UV absorbers may be used alone or in combination of two or more thereof. The amount of the UV absorber(s) used is preferably 5 wt % or less, more preferably 0.1 to 1 wt %, based on the weight of the two-component curable urethane adhesive, in terms of UV absorption effect and adhesion.

Examples of the plasticizers include hydrocarbons (process oil, liquid polybutadiene, liquid polyisobutylene, liquid polyisoprene, liquid paraffin, chlorinated paraffin, paraffin wax, a copolymerized oligomer of ethylene and α-olefin (C3-C20) (weight ratio: 0.1/99.9 to 99.9/0.1; Mw: 5,000 to 100,000), and a copolymerized oligomer of propylene and α-olefin (C4-C20) other than ethylene (weight ratio: 0.1/99.9 to 99.9/0.1; Mw: 5,000 to 100,000)); chlorinated paraffins; esters such as phthalic acid esters (e.g., diethyl phthalate (DEP), dibutyl phthalate (DBP), di-2-ethylhexyl phthalate (DOP), didecyl phthalate, dilauryl phthalate, distearyl phthalate, and diisononyl phthalate), adipic acid esters (e.g., di(2-ethylhexyl)adipate (DOA) and dioctyl adipate), and sebacic acid esters (e.g., dioctyl sebacate); animal and vegetable fats and oils (e.g., linoleic acid and linolenic acid); hydrogenated products of those having an unsaturated double bond that can be hydrogenated among these plasticizers; and fatty acid esters (butyl stearate, 2-ethylhexyl palmitate, 2-ethylhexyl stearate, monoglyceride behenate, cetyl 2-ethylhexanoate, isopropyl palmitate, cholesteryl isostearate, coconut fatty acid methyl ester, methyl laurate, methyl oleate, methyl stearate, isopropyl myristate, octyldodecyl myristate, myristyl myristate, stearyl stearate, isotridecyl stearate, 2-ethylhexanoic acid triglyceride, butyl laurate, and octyl oleate). These plasticizers may be used alone or in combination of two or more thereof. The amount of the plasticizer(s) used is preferably 100 wt % or less, more preferably 1 to 50 wt %, particularly preferably 3 to 40 wt %, more particularly preferably 5 to 35 wt %, most preferably 10 to 30 wt %, based on the total weight of the main agent and the curing agent, in terms of cohesive force of the adhesive.

Examples of the adhesion-imparting agents include terpene resin, terpene phenolic resin, phenolic resin, aromatic hydrocarbon-modified terpene resin, rosin, modified rosin, synthetic petroleum resins (e.g., aliphatic, aromatic, or alicyclic synthetic petroleum resins), coumarone-indene resin, xylene resin, styrene-based resin, dicyclopentadiene resin, and hydrogenated products of those having an unsaturated double bond that can be hydrogenated among these resins. These adhesion-imparting agents may be used alone or in combination of two or more thereof.

Of these, those having a polarity are preferred in terms of adhesion; rosin, phenolic resin, terpene phenolic resin, xylene resin, and hydrogenated products thereof are more preferred; and terpene phenolic resin and hydrogenated products thereof are particularly preferred. The amount of the adhesion-imparting agent(s) used is preferably 100 wt % or less, more preferably 1 to 50 wt %, particularly preferably 3 to 40 wt %, more particularly preferably 5 to 35 wt %, most preferably 10 to 30 wt %, based on the total weight of the main agent and the curing agent, in terms of adhesion and heat-resistance.

Examples of the fillers include carbonates (e.g., magnesium carbonate and calcium carbonate), sulfates (e.g., aluminum sulfate, calcium sulfate, and barium sulfate), sulfites (e.g., calcium sulfite), molybdenum disulfide, silicates (e.g., aluminum silicate and calcium silicate), diatomaceous earth, silica stone powder, talc, silica, and zeolite. These fillers are fine particles preferably having a volume average particle size of about 0.01 to 5 μm. These fillers may be used alone or in combination of two or more thereof. The amount of the filler(s) used is preferably 250 wt % or less, more preferably 0.5 to 100 wt %, based on the total weight of the main agent and the curing agent, in terms of cohesive force of the adhesive.

Examples of the pigments include inorganic pigments (e.g., alumina white, graphite, titanium oxide, ultrafine titanium oxide particles, zinc white, black iron oxide, mica-like iron oxide, white lead, white carbon, molybdenum white, carbon black, litharge, lithopone, barite, cadmium red, cadmium-mercury red, red iron oxide, molybdenum red, red lead, chrome yellow, cadmium yellow, barium yellow, strontium yellow, titanium yellow, titanium black, chromium oxide green, cobalt oxide, cobalt green, cobalt chromium green, azurite, Prussian blue, cobalt blue, cerulean blue, manganese violet, and cobalt violet) and organic pigments (e.g., shellac, insoluble azo pigments, soluble azo pigments, condensed azo pigments, phthalocyanine blue, and lake pigments). These pigments are fine particles preferably having a volume average particle size of about 0.01 to 5 μm. These pigments may be used alone or in combination of two or more thereof. The amount of the pigment(s) used is preferably 250 wt % or less, more preferably 0.1 to 50 wt %, based on the total weight of the main agent and the curing agent, in terms of cohesive force of the adhesive.

Examples of the antistatic agents include polyether polyols, surfactants, metallic conductive fillers, carbon black, and quaternary ammonium salts having an Mw of less than 5,000.

Examples of the anti-gelling agents (agents to retard urethane formation) include a compound (C) represented by a formula (6).

[Chem. 7]

$R^1$ and $R^2$ in the formula (6) each independently represent a C1-C6 hydrocarbon group, a C1-C6 alkoxy group, or a C3-C5 heterocyclic group.

The compound (C) can achieve effects of preventing gelation induced by a side reaction during urethane formation, ensuring the pot life during curing of the two-components, and reducing the aging time during curing. One compound (C) may be used alone or two or more of there may be used in combination.

Specific examples of the compound (C) include 2,4-pentanedione (acetylacetone), 3-methyl-2,4-pentanedione, 2,4-hexanedione, 2,2-dimethyl-3,5-hexanedione, 2,4-heptanedione, 3,5-heptanedione, 2,2,6,6-tetramethyl-3,5-heptanedione, 2,4-octanedion, 2,2,7-trimethyl-3,5-octanedion, 2,4-nonanedion, 3-methyl-2,4-nonanedion, 2-methyl-4,6-nonanedion, 1-phenyl-1,3-butanedione (benzoylacetone), dibenzoylmethane, 2-furoyl benzoyl methane, and other like β-diketones; methyl acetoacetate, ethyl acetoacetate, propyl acetoacetate, butyl acetoacetate, methyl propionyl acetate, ethyl propionyl acetate, propyl propionyl acetate, isopropyl propionyl acetate, butyl propionyl acetate, methyl butyryl acetate, ethyl butyryl acetate, propyl butyryl acetate, methyl caproyl acetate, ethyl caproyl acetate, propyl caproyl acetate, butyl caproyl acetate, and other like β-ketoesters; and dimethyl malonate, diethyl malonate, methyl ethyl malonate, diisopropyl malonate, dibutyl malonate, and other like malonic acid dialkyl esters.

The amount of the compound (C) used is preferably 0.01 to 5 wt %, more preferably 0.03 to 3 wt %, particularly preferably 0.05 to 1 wt %, based on the weight of the two-component curable urethane adhesive, although the amount is suitably selected depending on the desired reaction speed and the pot life. When the amount is 0.01 wt % or more, the gelation preventing effect tends to be effectively achieved. When the amount is 5 wt % or less, contamination of an adherend due to bleeding out of the compound (C) can be suppressed.

The NCO/OH ratio (ratio of the isocyanate group equivalent to the hydroxy group equivalent) during mixing of the main agent and the curing agent is preferably 0.3 to 2.0, more preferably 0.5 to 1.5, particularly preferably 0.7 to 1.3, in terms of film strength and adhesion of the resulting adhesive sheet.

The application of the two-component curable urethane adhesive of the present invention is not limited. For example, a coating obtained by curing a mixture of the main agent and the curing agent applied to a substrate such as a polyvinylchloride film or non-woven fabric can be used for a medical adhesive tape or the like, or an adhesive sheet obtained by curing a mixture of the main agent and the curing agent applied to a base film such as a polyester film or polyolefin film can be used for a surface protection film or the like by being attached to an optical part. The present invention also encompasses a cured product of the two-component curable urethane adhesive of the present invention, and a urethane adhesive sheet containing the cured product of the two-component curable urethane adhesive of the present invention.

The two-component curable urethane adhesive of the present invention may be cured by the following method, for example.

The two-component curable urethane adhesive is applied to a substrate (e.g., polyethylene terephthalate film, polyvinylchloride film, or non-woven fabric) by a bar coater or the like, followed by allowing to stand at 90° C. to 130° C. for 1 to 20 minutes, whereby the two-component curable urethane adhesive of the present invention can be cured.

An aging step may be performed, if necessary, in which the adhesive is further allowed to stand at 20° C. to 50° C. for 1 to 10 days.

Examples of the medical adhesive tape to which the two-component curable urethane adhesive and/or the urethane adhesive sheet is applied include surgical tape, kinesiology tape, and first-aid adhesive plasters. Examples of the optical part include polarizing plates, phase difference plates, light diffusers, anti-reflective films, electromagnetic wave shielding films, and glass substrates, which are used in liquid crystal displays, organic EL displays, plasma displays, field emission displays, and the like.

Specific examples of the method of forming the adhesive sheet are as follows.

A base film can be coated with the two-component curable urethane adhesive using a gravure coater, reverse roll coater, comma coater, spin coater, curtain coater, slot coater, bar coater, comma coater, die coater, knife coater, or the like. The amount of the adhesive (solids contents) to be applied during coating is preferably 0.5 to 300 g/m$^2$, more preferably 1 to 200 g/m$^2$, particularly preferably 10 to 100 g/m$^2$.

The coating temperature of the adhesive when applied to the base film is preferably 10° C. to 160° C., more preferably 25° C. to 120° C., in terms of coating properties and in order to prevent thermal deterioration. The viscosity of the adhesive in the above coating temperature ranges is preferably 0.01 to 100 Pa·s, more preferably 0.02 to 50 Pa·s, particularly preferably 0.03 to 10 Pa·s, in terms of formability (i.e., capability to form a thick coating, and providing an appearance without defects such as warping and sink marks after curing) and coating properties.

The viscosity herein is measured at 25° C. using a TVB-10M viscometer (available from Toki Sangyo Co., Ltd.).

Laminating is performed using a commonly used laminator such as dry laminator or extrusion laminator. After laminating, the adhesive is aged at 10° C. to 50° C. for 20 to 150 hours, whereby the adhesive is completely cured.

The urethane group concentration in the cured product of the two-component curable urethane adhesive of the present invention is preferably 5 to 25 wt % based on the total weight of the main agent and the curing agent, in terms of adhesion to an adherend.

EXAMPLES

The present invention will be specifically described below with reference to examples, but the present invention is not limited to the examples. Hereinafter, the "part(s)" refers to "part(s) by weight".

Production of Polyoxyalkylene Polyol

Production Example 1

A stainless steel autoclave equipped with a stirrer, a temperature controller, a heat exchanger as a condensation unit, a raw material supply line, and an exhaust line was charged with a PO adduct of glycerol ("SANNIX GP-1500" available from Sanyo Chemical Industries, Ltd.; primary content: 2%; hydroxy value: 112 mg KOH/g; 510 parts) and TPB (0.09 parts), followed by stirring. The pressure in the autoclave and the condensation unit was reduced to 0.005 MPa. PO (1,190 parts) was continuously fed into a liquid phase over 12 hours through the raw material supply line, while the reaction temperature was maintained at 70° C. to 80° C. Refrigerant at −30° C. was circulated in order to condensate and collect PO in the condensation unit. After aging at 70° C. for four hours, water (200 parts) was added, followed by heating at 130° C. to 140° C. for one hour. After heating for one hour, water was distilled off at normal pressure over two hours. Then, while the pressure was maintained at 4 to 7 kPa with steam being introduced, the remaining water and a low boiling point compound as a by-product were distilled off in vacuum over three hours. Then, high purity potassium hydroxide (purity: 96%; 12 parts) was added and stirred at 130° C. in vacuum to obtain a uniform solution, followed by dehydration. Subsequently, the temperature was raised for heating at 155° C. to 165° C. for 20 hours, whereby the allyl group in an allyl group-containing compound produced by a side reaction during the PO addition reaction was rearranged to a propenyl group, and the temperature was cooled to 85° C. to 90° C. Then, water (40 parts) was added and mixed at 85° C. to 90° C. for 30 minutes, and KYOWAAD 600 (available from Kyowa Chemical Industry Co., Ltd.; 40 parts) as an adsorbent was added, and mixed at the same temperature for 30 minutes, followed by removal of the adsorbent by filtration. Phosphoric acid and water were added, and the pH was adjusted to 4.0. Then, the temperature was raised for heating at 150° C. for five hours, whereby the propenyl group was hydrolyzed into a hydroxy group. Subsequently, the temperature was cooled to 110° C. to 130° C. for vacuum dehydration, and the temperature was then cooled to 90° C. KYOWAAD 1000 (available from Kyowa Chemical Industry Co., Ltd.; 40 parts) as an adsorbent was added at the same temperature and mixed for 30 minutes, followed by removal of the adsorbent by filtration. Thus, a polyoxyalkylene polyol (a1-1) was obtained. The (a1-1) had a hydroxy value of 36 mg KOH/g, an Mn of 4,700, a viscosity of 1,000 mPa·s/25° C., a primary content of 70%, and an unsaturation degree of 0.006 meq/g.

Production Example 2

A polyoxyalkylene polyol (a1-2) was obtained as in Production Example 1, except that the PO adduct of glycerol "SANNIX GP-1500" (510 parts) in Production Example 1 was replaced by a PO adduct of glycerol ("SANNIX GH-5000" available from Sanyo Chemical Industries, Ltd.; primary content: 2%; hydroxy value: 33 mg KOH/g; 966 parts), and the amount of PO fed was changed to 34 parts. The (a1-2) had a hydroxy value of 35 mg KOH/g, an Mn of 4,800, a viscosity of 900 mPa·s/25° C., a primary content of 60%, and an unsaturation degree of 0.006 meq/g.

Production Example 3

A stainless steel autoclave equipped with a stirrer, a temperature controller, a heat exchanger as a condensation unit, a raw material supply line, and an exhaust line was charged with a PO adduct of propylene glycol ("SANNIX PP-400" available from Sanyo Chemical Industries, Ltd.; primary content: 2%; hydroxy value: 280 mg KOH/g; 400 parts) and TPB (0.09 parts), followed by stirring. The pressure in the autoclave and the condensation unit was reduced to 0.005 MPa. PO (600 parts) was continuously fed into a liquid phase over 12 hours through the raw material supply line, while the reaction temperature was maintained at 70° C. to 80° C. Refrigerant at −30° C. was circulated in order to condensate and collect PO in the condensation unit. After aging at 70° C. for four hours, water (200 parts) was added, followed by heating at 130° C. to 140° C. for one hour. After heating for one hour, water was distilled off at normal pressure over two hours. Then, while the pressure was maintained at 4 to 7 kPa with steam being introduced, the remaining water and a low boiling point compound as a by-product were distilled off in vacuum over three hours. Subsequently, synthetic silicate ("KYOWAAD 600" available from Kyowa Chemical Industry Co., Ltd.; 30 parts) and water (40 parts) were added and stirred at 60° C. for three hours, and the mixture was taken out from the autoclave, followed by filtration through a 1-micron filter and then dehydration. Thus, a polyoxyalkylene polyol (a1-3) was obtained. The (a1-3) had a hydroxy value of 112 mg KOH/g, an Mn of 1,000, a viscosity of 200 mPa·s/25° C., a primary content of 70%, and an unsaturation degree of 0.010 meq/g.

Production Example 4

A stainless steel autoclave equipped with a stirrer, a temperature controller, a heat exchanger as a condensation unit, a raw material supply line, and an exhaust line was charged with a PO adduct of glycerol ("SANNIX GP-1500" available from Sanyo Chemical Industries, Ltd.; primary content: 2%; hydroxy value: 112 mg KOH/g; 510 parts) and TPB (0.09 parts), followed by stirring. The pressure in the autoclave and the condensation unit was reduced to 0.005 MPa. PO (1,190 parts) was continuously fed into a liquid phase over 12 hours through the raw material supply line, while the reaction temperature was maintained at 70° C. to 80° C. Refrigerant at −30° C. was circulated in order to condensate and collect PO in the condensation unit. After aging at 70° C. for four hours, water (200 parts) was added, followed by heating at 130° C. to 140° C. for one hour. After heating for one hour, water was distilled off at normal pressure over two hours. Then, while the pressure was maintained at 4 to 7 kPa with steam being introduced, the remaining water and a low boiling point compound as a by-product were distilled off in vacuum over three hours. Subsequently, synthetic silicate ("KYOWAAD 600" available from Kyowa Chemical Industry Co., Ltd.; 30 parts) and water (40 parts) were added and stirred at 60° C. for three hours, and the mixture was taken out from the autoclave, followed by filtration through a 1-micron filter and then dehydration. Thus, a polyoxyalkylene polyol (a1-4) was obtained. The (a1-4) had a hydroxy value of 34 mg KOH/g, an Mn of 5,000, a viscosity of 900 mPa·s/25° C., a primary content of 72%, and an unsaturation degree of 0.06 meq/g.

Production Example 5

After a PO adduct of propylene glycol ("SANNIX PP-400" available from Sanyo Chemical Industries, Ltd.; primary content: 2%; hydroxy value: 280 mg KOH/g; 400 parts) and potassium hydroxide (4.0 parts) were fed, PO (600 parts) was continuously fed into a liquid phase through the raw material supply line, while the reaction temperature was maintained at 90° C. to 100° C. After aging at 100° C. for three hours, synthetic silicate ("KYOWAAD 600" available from Kyowa Chemical Industry Co., Ltd.; 30 parts) and water (40 parts) were added for treatment at 60° C. for three hours, and the mixture was taken out from the autoclave, followed by filtration through a 1-micron filter and then dehydration. Thus, a polyoxyalkylene polyol (a1-5) was obtained. The (a1-5) had a hydroxy value of 112 mg KOH/g, an Mn of 1,000, a viscosity of 150 mPa·s/25° C., a primary content of 2%, and an unsaturation degree of 0.010 meq/g.

Production Example 6

After a PO adduct of propylene glycol ("SANNIX PP-400" available from Sanyo Chemical Industries, Ltd.; primary content: 2%; hydroxy value: 280 mg KOH/g; 670 parts) and potassium hydroxide (4.0 parts) were fed, PO (330 parts) was continuously fed into a liquid phase through the raw material supply line, while the reaction temperature was maintained at 90° C. to 100° C. After aging at 100° C. for three hours, synthetic silicate ("KYOWAAD 600" available from Kyowa Chemical Industry Co., Ltd.; 30 parts) and water (40 parts) were added for treatment at 60° C. for three hours, and the mixture was taken out from the autoclave, followed by filtration through a 1-micron filter and then dehydration. Thus, a polyoxyalkylene polyol (a1-6) was obtained. The (a1-6) had a hydroxy value of 188 mg KOH/g, an Mn of 600, a viscosity of 85 mPa·s/25° C., a primary content of 2%, and an unsaturation degree of 0.010 meq/g.

Production Example 7

A polyoxyalkylene polyol (a1-7) was obtained as in Production Example 1, except that TPB (0.09 parts) in Production Example 1 was replaced by potassium hydroxide (4.0 parts). The (a1-7) had a hydroxy value of 35 mg KOH/g, an Mn of 4,800, a viscosity of 1050 mPa·s/25° C., a primary content of 2%, and an unsaturation degree of 0.006 meq/g.

Production Example 8

After a PO adduct of glycerol ("SANNIX GP-600" available from Sanyo Chemical Industries, Ltd.; primary content: 2%; hydroxy value: 280 mg KOH/g; 120 parts) and potassium hydroxide (4.0 parts) were fed, PO (740 parts) was continuously fed into a liquid phase through the raw material supply line, while the reaction temperature was maintained at 90° C. to 100° C. At this point, the primary content was 2%. After adding EO (140 parts) and aging at 100° C. for three hours, synthetic silicate ("KYOWAAD 600" available from Kyowa Chemical Industry Co., Ltd.; 30 parts) and water (40 parts) were added for treatment at 60° C. for three hours, and the mixture was taken out from the autoclave, followed by filtration through a 1-micron filter and then dehydration. Thus, a polyoxyalkylene polyol (a2-1) was obtained. The (a2-1) had a hydroxy value of 33 mg KOH/g, an Mn of 5,100, a viscosity of 900 mPa·s/25° C., and an unsaturation degree of 0.08 meq/g.

Production Example 9

A polyoxyalkylene polyol (a2-2) was obtained as in Production Example 1, except that EO (270 parts) was further fed after feeding PO in Production Example 1. The (a2-2) had a hydroxy value of 33 mg KOH/g, an Mn of 5,100, a viscosity of 1050 mPa·s/25° C., and an unsaturation degree of 0.007 meq/g.

Production Example 10

A polyoxyalkylene polyol was obtained as in Production Example 8 to the point before addition of synthetic silicate and water. Subsequently, potassium hydroxide (4.0 parts) was added, and EO (270 parts) was fed over six hours through the raw material supply line, while the reaction temperature was maintained at 130° C. to 140° C., followed by aging at 130° C. to 140° C. for three hours. Then, synthetic silicate ("KYOWAAD 600" available from Kyowa Chemical Industry Co., Ltd.; 30 parts) and water (40 parts) were added and stirred at 60° C. for three hours. The mixture was taken out from the autoclave, followed by filtration through a 1-micron filter and then dehydration for two hours. Thus, a polyoxyalkylene polyol (a2-3) was obtained. The (a2-3) had a hydroxy value of 29 mg KOH/g, an Mn of 5,800, a viscosity of 1100 mPa·s/25° C., and an unsaturation degree of 0.05 meq/g.

Production of Urethane Prepolymer

Production Example 11

A four-necked flask equipped with a reflux condenser, a stirring bar, and a thermometer was charged with the polyoxyalkylene polyol (a1-1) (504.3 g) obtained in Production Example 1, the polyoxyalkylene polyol (a1-3) (432.3 g) obtained in Production Example 3, diethyl malonate (0.5 g), and HDI (hexamethylene diisocyanate (DURANATE 50 M available from Asahi Kasei Corp.; 63.4 g)). The mixture was reacted at 120° C. for eight hours, whereby a hydroxy group-terminated urethane prepolymer (P1-1) was obtained. The urethane prepolymer (P1-1) had a hydroxy value of 24 mg KOH/g, a viscosity of 16,000 mPa·s/25° C., and an Mw of 18,000.

Production Example 12

A four-necked flask equipped with a reflux condenser, a stirring bar, and a thermometer was charged with the polyoxyalkylene polyol (a1-1) (525.2 g) obtained in Production Example 1, the polyoxyalkylene polyol (a1-3) (253.2 g) obtained in Production Example 3, the polyoxyalkylene polyol (a1-6) (150.9 g) obtained in Production Example 6, diethyl malonate (0.5 g), and HDI (70.8 g). The mixture was reacted at 120° C. for eight hours, whereby a hydroxy group-terminated urethane prepolymer (P1-2) was obtained. The urethane prepolymer (P1-2) had a hydroxy value of 28 mg KOH/g, a viscosity of 23,000 mPa·s/25° C., and an Mw of 21,000.

Production Example 13

A four-necked flask equipped with a reflux condenser, a stirring bar, and a thermometer was charged with the polyoxyalkylene polyol (a1-2) (511.4 g) obtained in Production Example 2, the polyoxyalkylene polyol (a1-3) (426.1 g) obtained in Production Example 3, diethyl malonate (0.5 g), and HDI (62.5 g). The mixture was reacted at 120° C. for eight hours, whereby a hydroxy group-terminated urethane prepolymer (P1-3) was obtained. The urethane prepolymer (P1-3) had a hydroxy value of 24 mg KOH/g, a viscosity of 17,000 mPa·s/25° C., and an Mw of 18,000.

Production Example 14

A four-necked flask equipped with a reflux condenser, a stirring bar, and a thermometer was charged with the polyoxyalkylene polyol (a1-3) (413.3 g) obtained in Production Example 3, the polyoxyalkylene polyol (a2-2) (526.0 g) obtained in Production Example 9, diethyl malonate (0.5 g), and HDI (60.7 g). The mixture was reacted at 120° C. for eight hours, whereby a hydroxy group-terminated urethane prepolymer (P1-4) was obtained. The urethane prepolymer (P1-4) had a hydroxy value of 23 mg KOH/g, a viscosity of 19,000 mPa·s/25° C., and an Mw of 20,000.

Production Example 15

A four-necked flask equipped with a reflux condenser, a stirring bar, and a thermometer was charged with the polyoxyalkylene polyol (a1-1) (494.5 g) obtained in Production Example 1, the polyoxyalkylene polyol (a1-3) (423.8 g) obtained in Production Example 3, diethyl malonate (0.5 g), and isophorone diisocyanate (IPDI) (81.7 g). The mixture was reacted at 120° C. for 10 hours, whereby a hydroxy group-terminated urethane prepolymer (P1-5) was obtained. The urethane prepolymer (P1-5) had a hydroxy value of 24 mg KOH/g, a viscosity of 15,000 mPa·s/25° C., and an Mw of 19,000.

Production Example 16

A four-necked flask equipped with a reflux condenser, a stirring bar, and a thermometer was charged with the polyoxyalkylene polyol (a1-5) (799.0 g) obtained in Production Example 5, diethyl malonate (0.5 g), and HDI (201.0 g). The mixture was reacted at 120° C. for six hours, whereby an isocyanate group-terminated urethane prepolymer (P2-1) was obtained. The urethane prepolymer (P2-1) had an isocyanate group content of 3.4%, a viscosity of 10,000 mPa·s/25° C., and an Mw of 4,000.

Production Example 17

A four-necked flask equipped with a reflux condenser, a stirring bar, and a thermometer was charged with the polyoxyalkylene polyol (a1-5) (750.3 g) obtained in Production Example 5, diethyl malonate (0.5 g), and isophorone diisocyanate (IPDI) (249.7 g). The mixture was reacted at 120° C. for seven hours, whereby an isocyanate group-terminated urethane prepolymer (P2-2) was obtained. The urethane prepolymer (P2-2) had an isocyanate group content of 3.1%, a viscosity of 9,000 mPa·s/25° C., and an Mw of 4,500.

Comparative Production Example 1

A four-necked flask equipped with a reflux condenser, a stirring bar, and a thermometer was charged with the polyoxyalkylene polyol (a1-4) (518.6 g) obtained in Production Example 4, the polyoxyalkylene polyol (a1-5) (419.8 g) obtained in Production Example 5, diethyl malonate (0.5 g), and HDI (61.6 g). The mixture was reacted at 120° C. for eight hours, whereby a hydroxy group-terminated urethane prepolymer (P1'-1) was obtained. The urethane prepolymer (P1'-1) had a hydroxy value of 24 mg KOH/g, a viscosity of 15,000 mPa·s/25° C., and an Mw of 15,000.

Comparative Production Example 2

A four-necked flask equipped with a reflux condenser, a stirring bar, and a thermometer was charged with the polyoxyalkylene polyol (a1-4) (539.4 g) obtained in Production Example 4, the polyoxyalkylene polyol (a1-5) (245.6 g) obtained in Production Example 5, the polyoxyalkylene polyol (a1-6) (146.3 g) obtained in Production Example 6, diethyl malonate (0.5 g), and HDI (68.7 g). The mixture was reacted at 120° C. for eight hours, whereby a hydroxy group-terminated urethane prepolymer (P1'-2) was obtained. The urethane prepolymer (P1'-2) had a hydroxy value of 28 mg KOH/g, a viscosity of 18,000 mPa·s/25° C., and an Mw of 18,000.

Comparative Production Example 3

A four-necked flask equipped with a reflux condenser, a stirring bar, and a thermometer was charged with the polyoxyalkylene polyol (a1-5) (413.3 g) obtained in Production Example 5, the polyoxyalkylene polyol (a2-1) (526.0 g) obtained in Production Example 8, diethyl malonate (0.5 g), and HDI (60.7 g). The mixture was reacted at 120° C. for eight hours, whereby a hydroxy group-terminated urethane prepolymer (P1'-3) was obtained. The urethane prepolymer (P1'-3) had a hydroxy value of 23 mg KOH/g, a viscosity of 13,500 mPa·s/25° C., and an Mw of 12,000.

Comparative Production Example 4

A four-necked flask equipped with a reflux condenser, a stirring bar, and a thermometer was charged with the polyoxyalkylene polyol (a1-6) (307.1 g) obtained in Production Example 6, the polyoxyalkylene polyol (a2-3) (620.8 g) obtained in Production Example 10, diethyl malonate (0.5 g), and HDI (72.0 g). The mixture was reacted at 120° C. for eight hours, whereby a hydroxy group-terminated urethane prepolymer (P1'-4) was obtained. The urethane prepolymer (P1'-4) had a hydroxy value of 29 mg KOH/g, a viscosity of 20,000 mPa·s/25° C., and an Mw of 19,000.

Comparative Production Example 5

A four-necked flask equipped with a reflux condenser, a stirring bar, and a thermometer was charged with polyoxyalkylene polyol (a1-5) (433.3 g) obtained in Production Example 5, the polyoxyalkylene polyol (a1-7) (504.2 g) obtained in Production Example 7, diethyl malonate (0.5 g), and HDI (62.5 g). The mixture was reacted at 120° C. for eight hours, whereby a hydroxy group-terminated urethane prepolymer (P1'-5) was obtained. The urethane prepolymer (P1'-5) had a hydroxy value of 24 mg KOH/g, a viscosity of 16,000 mPa·s/25° C., and an Mw of 18,000.

Table 1 shows the raw materials and their amounts used in Production Examples 11 to 17 and Comparative Production Examples 1 to 5; the percentage of the total number of groups represented by the formula (1) in the polyol (A1) relative to the total number of the groups represented by the formulas (1) and (2) in the polyol (A1); the total unsaturation degree of the polyol component (A) used in each urethane prepolymer; and the hydroxy value, isocyanate group content, viscosity, and Mw of the urethane prepolymer.

TABLE 1

| | | Production Examples | | | | | | |
|---|---|---|---|---|---|---|---|---|
| | | 11 | 12 | 13 | 14 | 15 | 16 | 17 |
| Urethane prepolymer | | | | Main agent | | | Curing agent | |
| | (P1) or (P2) | (P1-1) | (P1-2) | (P1-3) | (P1-4) | (P1-5) | (P2-1) | (P2-2) |
| Polyol component (A) | (a1-1) (Mn = 4,700) | 504.3 | 525.2 | | | | 494.5 | |
| | (a1-2) (Mn = 4,800) | | | 511.4 | | | | |
| | (a1-3) (Mn = 1,000) | 432.3 | 253.2 | 426.1 | 413.3 | 423.8 | | |
| | (a1-4) (Mn = 5,000) | | | | | | | |
| | (a1-5) (Mn = 1,000) | | | | | | 799.0 | 750.3 |
| | (a1-6) (Mn = 600) | | 150.9 | | | | | |
| | (a1-7) (Mn = 4,800) | | | | | | | |
| | (a2-1) (Mn = 5,100) | | | | | | | |
| | (a2-2) (Mn = 5,100) | | | | 526.0 | | | |
| | (a2-3) (Mn = 5,800) | | | | | | | |
| Organic polyisocyanate component (B) | HDI (Chemical formula weight = 168.2) | 63.4 | 70.8 | 62.5 | 60.7 | | 201.0 | |
| | IPDI (Chemical formula weight = 222.3) | | | | | 81.7 | | 249.7 |
| Compound (C) represented by formula (6) | Diethyl malonate | 0.5 | 0.5 | 0.5 | 0.5 | 0.5 | 0.5 | 0.5 |

TABLE 1-continued

| | | | | | | |
|---|---|---|---|---|---|---|
| Percentage of total number of groups represented by formula (1) in polyol (A1) based on total number of groups represented by formulas (1) and (2) in polyol (A1) | 70 | 42 | 68 | 70 | 70 | 2 | 2 |
| Total unsaturation degree of polyol components (A) used for prepolymer (meq/g) | 0.008 | 0.008 | 0.008 | 0.008 | 0.008 | 0.010 | 0.008 |
| Hydroxy value of urethane prepolymer (mgKOH/g) | 24 | 28 | 24 | 23 | 24 | — | — |
| Isocyanate group content of urethane prepolymer (%) | — | — | — | — | — | 3.4 | 3.1 |
| Viscosity of urethane prepolymer (mPa·s/25° C.) | 16,000 | 23,000 | 17,000 | 19,000 | 15,000 | 10,000 | 9,000 |
| Weight average molecular weight of urethane prepolymer | 18,000 | 21,000 | 18,000 | 20,000 | 19,000 | 4,000 | 4,500 |

| | | | Comparative Production Examples | | | | |
|---|---|---|---|---|---|---|---|
| | | | 1 | 2 | 3 | 4 | 5 |
| Urethane prepolymer | | | | | Main agent | | |
| | | | (P1'-1) | (P1'-2) | (P1'-3) | (P1'-4) | (P1'-5) |
| Polyol component (A) | (a1-1) | (Mn = 4,700) | | | | | |
| | (a1-2) | (Mn = 4,800) | | | | | |
| | (a1-3) | (Mn = 1,000) | | | | | |
| | (a1-4) | (Mn = 5,000) | 518.6 | 539.4 | | | |
| | (a1-5) | (Mn = 1,000) | 419.8 | 245.6 | 413.3 | | 433.3 |
| | (a1-6) | (Mn = 600) | | 146.3 | | 307.1 | |
| | (a1-7) | (Mn = 4,800) | | | | | 504.2 |
| | (a2-1) | (Mn = 5,100) | | | 526.0 | | |
| | (a2-2) | (Mn = 5,100) | | | | | |
| | (a2-3) | (Mn = 5,800) | | | | 620.8 | |
| Organic polyisocyanate component (B) | HDI (Chemical formula weight = 168.2) | | 61.6 | 68.7 | 60.7 | 72.0 | 62.5 |
| | IPDI (Chemical formula weight = 222.3) | | | | | | |
| Compound (C) represented by formula (6) | Diethyl malonate | | 0.5 | 0.5 | 0.5 | 0.5 | 0.5 |
| Percentage of total number of groups represented by formula (1) in polyol (A1) based on total number of groups represented by formulas (1) and (2) in polyol (A1) | | | 16 | 15 | 2 | 2 | 2 |
| Total unsaturation degree of polyol components (A) used for prepolymer (meq/g) | | | 0.038 | 0.039 | 0.049 | 0.037 | 0.008 |
| Hydroxy value of urethane prepolymer (mgKOH/g) | | | 24 | 28 | 23 | 29 | 24 |
| Isocyanate group content of urethane prepolymer (%) | | | — | — | — | — | — |
| Viscosity of urethane prepolymer (mPa·s/25° C.) | | | 15,000 | 18,000 | 13,500 | 20,000 | 16,000 |
| Weight average molecular weight of urethane prepolymer | | | 15,000 | 18,000 | 12,000 | 19,000 | 18,000 |

Examples 1 to 12 and Comparative Examples 1 to 6

One of the prepolymers (P1-1) to (P1-5), (P1'-1) to (P1'-5) or polyol (a1-1) (the polyoxyalkylene polyol (a1-1) obtained in Production Example 1) as the main agent, one of the prepolymers (P2-1) to (P2-2) or DURANATE TLA-100 (HDI isocyanurate available from Asahi Kasei Corp.; chemical formula weight: 540) as the curing agent, ethyl acetate as a solvent, and K-KAT XK-635 (available from Kusumoto Chemicals, Ltd.) as a curing catalyst (D-1) were mixed in amounts (parts) shown in Table 2. The mixture was applied to a 38-μm thick polyethylene terephthalate film using a bar coater to give a solid film thickness of 50 μm. Curing was performed at 110° C. for 10 minutes, followed by aging at 25° C. for three days, whereby an adhesive sheet was obtained. Each adhesive sheet obtained was evaluated in terms of initial adhesion, film strength, and post-damp-heattest adhesion by the following evaluation methods. Table 3 shows the evaluation results, the urethane group concentration in the cured film of the adhesive, and the NCO/OH ratio during curing of the two components.

(1) Initial Adhesion Measurement Method

Each of the adhesive sheets obtained in Examples 1 to 12 and Comparative Examples 1 to 6 was cut into the size of 200 mm×25 mm, and the piece was attached to a SUS plate. A tensile tester was used to measure the peeling strength at 180° (unit: N/25 mm) at 23° C. and a tension speed of 1,000 mm/min. Measurement was performed on five samples. Table 3 shows average values. The adhesive sheet for surgical tape or the like preferably has a peeling strength in the range of 10 to 15 N/25 mm. The adhesive sheet for a surface protection sheet or the like preferably has a peeling strength in the range of 1 to 5 N/25 mm. The state of the peeled surface was also evaluated based on the following criteria.

<Criteria for State of Peeled Surface>

Good: Interfacial peeling is observed between the polyethylene terephthalate film and the adhesive.

Poor: Interfacial failure is observed in the adhesive.

(2) Film Strength Evaluation Method

The adhesive surface of each of the adhesive sheets obtained in Examples 1 to 12 and Comparative Examples 1 to 6 was rubbed strongly 10 times with a finger to visually check for peeling of the adhesive. Evaluation criteria are as follows.

Excellent: The adhesive surface is not scratched at all.
Good: The adhesive surface is scratched but not cloudy.
Fair: The adhesive surface is scratched and cloudy.
Poor: Interfacial failure and peeling are observed.

(3) Post-Damp-Heat-Test Adhesion Evaluation Method

Each of the adhesive sheets obtained in Examples 1 to 12 and Comparative Examples 1 to 6 was cut into the size of 200 mm×25 mm. The piece was attached to a SUS plate, and stored in a high temperature humidistat maintained at 65° C. and 95% RH for 72 hours. Then, the piece was taken out, and allowed to stand at 23° C. and normal humidity for 24 hours. Subsequently, a tensile tester was used to measure the peeling strength at 180° (unit: N/25 mm) at 23° C. and a tension speed of 1,000 mm/min. Measurement was performed on five samples. Table 3 shows average values.

For use for the surgical tape, a surface protection sheet, or the like, it is more advantageous when the difference between the post-damp-heat-test adhesion and the initial adhesion is smaller in terms of peeling easiness after prolonged attachment, with the difference being preferably 5 N/25 mm or less.

TABLE 2

| | | Examples | | | | | | | | | | | |
|---|---|---|---|---|---|---|---|---|---|---|---|---|---|
| | | 1 | 2 | 3 | 4 | 5 | 6 | 7 | 8 | 9 | 10 | 11 | 12 |
| Main agent | (P1-1) | 68 | 56 | 49 | — | — | — | — | — | 93.5 | 68 | — | 66 |
| | (P1-2) | — | — | — | 64 | 45 | — | — | — | — | — | — | — |
| | (P1-3) | — | — | — | — | — | 68 | — | — | — | — | — | — |
| | (P1-4) | — | — | — | — | — | — | 69 | — | — | — | — | — |
| | (P1-5) | — | — | — | — | — | — | — | — | — | — | 68 | — |
| | (a1-1) | — | — | — | — | — | — | — | 58 | — | — | — | — |
| | (P1'-1) | — | — | — | — | — | — | — | — | — | — | — | — |
| | (P1'-2) | — | — | — | — | — | — | — | — | — | — | — | — |
| | (P1'-3) | — | — | — | — | — | — | — | — | — | — | — | — |
| | (P1'-4) | — | — | — | — | — | — | — | — | — | — | — | — |
| | (P1'-5) | — | — | — | — | — | — | — | — | — | — | — | — |
| Curing agent | (P2-1) | 32 | 44 | 51 | 36 | 55 | 32 | 31 | 42 | — | 32 | 32 | — |
| | (P2-2) | — | — | — | — | — | — | — | — | — | — | — | 34 |
| | TLA-100 (Chemical formula weight = 540) | — | — | — | — | — | — | — | — | 6.5 | — | — | — |
| Solvent | Ethyl acetate | — | — | — | — | — | — | — | — | — | 5 | — | — |
| Curing catalyst | (D-1) | 0.1 | 0.1 | 0.1 | 0.1 | 0.1 | 0.1 | 0.1 | 0.1 | 0.1 | 0.1 | 0.1 | 0.1 |
| Average total unsaturation degree of all polyol components (A) (meq/g) | | 0.008 | 0.009 | 0.009 | 0.009 | 0.009 | 0.008 | 0.008 | 0.007 | 0.008 | 0.008 | 0.008 | 0.008 |

| | | Comparative Examples | | | | | |
|---|---|---|---|---|---|---|---|
| | | 1 | 2 | 3 | 4 | 5 | 6 |
| Main agent | (P1-1) | — | — | — | — | — | — |
| | (P1-2) | — | — | — | — | — | — |
| | (P1-3) | — | — | — | — | — | — |
| | (P1-4) | — | — | — | — | — | — |
| | (P1-5) | — | — | — | — | — | — |
| | (a1-1) | — | — | — | — | — | — |
| | (P1'-1) | 68 | 56 | — | — | — | — |
| | (P1'-2) | — | — | 64 | — | — | — |
| | (P1'-3) | — | — | — | 68 | — | — |
| | (P1'-4) | — | — | — | — | 63 | — |
| | (P1'-5) | — | — | — | — | — | 68 |
| Curing agent | (P2-1) | 32 | 44 | 36 | 32 | 37 | 32 |
| | (P2-2) | — | — | — | — | — | — |
| | TLA-100 (Chemical formula weight = 540) | — | — | — | — | — | — |

TABLE 2-continued

|  |  |  |  |  |  |  |  |
|---|---|---|---|---|---|---|---|
|  | Solvent Ethyl acetate | — | — | — | — | — | — |
|  | Curing catalyst (D-1) | 0.1 | 0.1 | 0.1 | 0.1 | 0.1 | 0.1 |
|  | Average total unsaturation degree of all polyol components (A) (meq/g) | 0.030 | 0.027 | 0.030 | 0.038 | 0.028 | 0.008 |

TABLE 3

| Properties | Examples | | | | | | | | | |
|---|---|---|---|---|---|---|---|---|---|---|
|  | 1 | 2 | 3 | 4 | 5 | 6 | 7 | 8 | 9 | 10 |
| Urethane group concentration (wt %) | 15.1 | 17.4 | 18.8 | 16.5 | 20.0 | 15.0 | 14.6 | 11.9 | 8.4 | 15.1 |
| NCO/OH ratio during curing of two components | 0.9 | 1.5 | 2.0 | 0.9 | 2.0 | 0.9 | 0.9 | 0.9 | 0.9 | 0.9 |
| Initial adhesion (N/25 mm) | 13 | 4 | 1 | 14 | 2 | 13 | 12 | 5 | 1 | 13 |
| Post-damp-heat-test adhesion (N/25 mm) | 15 | 6 | 2 | 16 | 5 | 15 | 17 | 8 | 5 | 15 |
| State of peeled surface | Good | Good | Good | Good | Good | Good | Good | Good | Good | Good |
| Film strength | Good | Excellent | Excellent | Good | Excellent | Good | Good | Good | Excellent | Good |

| Properties | Examples | | Comparative Examples | | | | | |
|---|---|---|---|---|---|---|---|---|
|  | 11 | 12 | 1 | 2 | 3 | 4 | 5 | 6 |
| Urethane group concentration (wt %) | 16.9 | 15.5 | 14.9 | 17.3 | 16.4 | 14.8 | 16.8 | 15.1 |
| NCO/OH ratio during curing of two components | 0.9 | 0.9 | 0.9 | 1.5 | 0.9 | 0.9 | 0.9 | 0.9 |
| Initial adhesion (N/25 mm) | 13 | 14 | 11 | 7 | 12 | 11 | 10 | 12 |
| Post-damp-heat-test adhesion (N/25 mm) | 15 | 16 | 17 | 14 | 19 | 22 | 22 | 18 |
| State of peeled surface | Good | Good | Poor | Good | Poor | Poor | Poor | Good |
| Film strength | Good | Good | Poor | Fair | Poor | Poor | Poor | Fair |

As shown in Table 3, in the urethane adhesive sheets of the examples, the polyol component (A) contains the polyol (A1) in which the total number of groups represented by formula (1) accounts for 40% or more, and the average total unsaturation degree is 0.010 meq/g or less. In each of these urethane adhesive sheets, the state of the peeled surface is excellent, the film strength is high, and the difference between the initial adhesion and the post-damp-heat-test adhesion is small, as compared to those of the urethane adhesive sheets of the comparative examples not satisfying the above conditions.

INDUSTRIAL APPLICABILITY

The two-component curable urethane adhesive of the present invention is usable as a skin adhesive (e.g., surgical tape and first-aid adhesive plasters) and as an adhesive for attaching various optical parts (e.g., polarizing plates, phase difference plate, and light diffusers) to glass substrates in various image display devices (e.g., liquid crystal displays, organic EL displays, plasma displays, and field emission displays). Thus, the two-component curable urethane adhesive is applicable to such a wide range of applications and is very useful.

The invention claimed is:
1. A two-component curable urethane adhesive comprising:
a main agent; and
a curing agent,
the main agent containing at least one of a hydroxy group-containing urethane prepolymer (P1) or a polyol component (A), the hydroxy group-containing urethane prepolymer (P1) being a reaction product between the polyol component (A) and an organic polyisocyanate component (B),
the curing agent containing at least one of an isocyanate group-containing urethane prepolymer (P2) or an organic polyisocyanate component (B), the isocyanate group-containing urethane prepolymer (P2) being a reaction product between the polyol component (A) and the organic polyisocyanate component (B),
the main agent containing the urethane prepolymer (P1), or the curing agent containing the urethane prepolymer (P2), or the main agent and the curing agent containing the urethane prepolymer (P1) and the urethane prepolymer (P2), respectively,
wherein the two-component curable urethane adhesive satisfies the following properties (1) to (5):
(1) at least one of the polyol component (A) used in the hydroxy group-containing urethane prepolymer (P1) or the polyol component (A) used as the main agent contains a polyol (A1) having at least one of a group represented by a formula (1) or a group represented by a formula (2) at a molecular end thereof, and a total number of groups represented by the formula (1) in the polyol (A1) accounts for 40% or more based on a total number of groups represented by the formulas (1) and (2) in the polyol (A1),

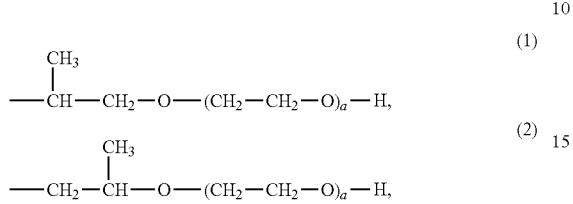

wherein in the formulas (1) and (2), each a is independently an integer of 0 or greater;

(2) an average total unsaturation degree of all the polyol components (A) used in the two-component curable urethane adhesive is 0.010 meq/g or less;

(3) a weight average molecular weight of each of the urethane prepolymer (P1) and the urethane prepolymer (P2) is 1,000 to 100,000;

(4) a chemical formula weight or number average molecular weight of each of the polyol component (A) and the organic polyisocyanate component (B) is 20,000 or less; and (5) a total weight of solvents in the main agent excluding the polyol component (A) and solvents in the curing agent excluding the organic polyisocyanate component (B) accounts for 5 wt % or less based on a total weight of the main agent and the curing agent.

2. The two-component curable urethane adhesive according to claim 1, wherein at least one of the polyol (A1) used in the urethane prepolymer (P1) or the polyol (A1) used as the main agent is at least one of a polyoxyalkylene polyol (a1) having a hydroxypropyl group at a molecular end thereof represented by a formula (3) or an ethylene oxide adduct (a2) of the polyoxyalkylene polyol (a1),

[Chem. 3]

wherein X is a m-valent residue produced by removing active hydrogen atoms from a compound having m active hydrogen atoms; A is a C2-C12 alkylene group in which one or more hydrogen atoms are optionally replaced by phenyl groups, halogenated phenyl groups, or halogen atoms; Z is a propylene group; m is an integer of 2 to 20; p is an integer of 0 to 199, q is an integer of 1 to 200, with p and q satisfying the following formula $1 \leq p+q \leq 200$.

3. A cured product of the two-component curable urethane adhesive according to claim 2.

4. A urethane adhesive sheet comprising:
the cured product of the two-component curable urethane adhesive according to claim 3.

5. A cured product of the two-component curable urethane adhesive according to claim 1.

6. A urethane adhesive sheet comprising:
the cured product of the two-component curable urethane adhesive according to claim 5.

* * * * *